United States Patent
Jonner et al.

(10) Patent No.: US 6,186,602 B1
(45) Date of Patent: Feb. 13, 2001

(54) HYDRAULIC VEHICLE BRAKING SYSTEM

(75) Inventors: Wolf-Dieter Jonner, Beilstein Schmidhausen; Ortwin Engfer, Stuttgart; Anton Van Zanten, Ditzingen; Jurgen Binder, Stuttgart; Martin Pfau, Weissach; Eberhardt Schunck, Landau; Andreas Kaessmann, Gerlingen; Juergen Hachtel, Moeckmuehl; Ulrich Gottwick, Stuttgart; Michael Schubert, Althengstett, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/125,513

(22) PCT Filed: Nov. 10, 1997

(86) PCT No.: PCT/DE97/02619

§ 371 Date: Dec. 4, 1998

§ 102(e) Date: Dec. 4, 1998

(87) PCT Pub. No.: WO98/28174

PCT Pub. Date: Jul. 2, 1998

(30) Foreign Application Priority Data

Dec. 20, 1996 (DE) ............................................... 196 53 308

(51) Int. Cl.[7] .................................................... B60T 8/42
(52) U.S. Cl. ..................................... 303/115.4; 188/116.2
(58) Field of Search ............................ 303/116.1, 116.2, 303/115.1, 115.4, 115.5, 188, 187, 186

(56) References Cited

U.S. PATENT DOCUMENTS

| | | | |
|---|---|---|---|
| 4,846,534 | * | 7/1989 | Leiber et al. ........................ 303/115 |
| 5,123,717 | * | 6/1992 | Willmann ......................... 303/113.55 |
| 5,172,962 | * | 12/1992 | Takata .................................... 303/113 |
| 5,261,730 | * | 11/1993 | Steiner et al. .................... 303/113.4 |
| 5,330,258 | * | 7/1994 | Hoshoya et al. ................. 303/113.2 |
| 5,385,395 | * | 1/1995 | Volz ................................... 303/116.1 |
| 5,435,636 | * | 7/1995 | Sasanoi ............................. 303/116.1 |
| 5,826,953 | * | 10/1998 | Heubner ......................... 303/122.13 |
| 5,927,827 | * | 7/1999 | Reuter et al. .................... 303/116.2 |
| 5,941,608 | * | 8/1999 | Campau et al. ................. 303/113.4 |
| 5,979,999 | * | 11/1999 | Poertzgen et al. .............. 303/116.1 |

FOREIGN PATENT DOCUMENTS

4037662A1 * 6/1992 (DE).

OTHER PUBLICATIONS

Jonner et al, Electrohydraulic Brake System—The First Approach to Brake–By–Wire Technology, SAE Paper 960991, Feb. 1996.*

* cited by examiner

Primary Examiner—Robert J. Oberleitner
Assistant Examiner—Bradley King
(74) Attorney, Agent, or Firm—Ronald E. Greigg; Edwin E. Greigg

(57) ABSTRACT

A hydraulic vehicle brake system in which normal service brake operation can be carried out by using external hydraulic energy, and in the event of a lack of external hydraulic energy, auxiliary brake operation by muscle power is possible, with a hydraulic transmission that comes from a master cylinder that can be actuated by means of the brake pedal. The external hydraulic energy is stored, for example, in an accumulator with a gas buffer, which can lead to a gas content in the hydraulic fluid for the service brake operation. The system includes a dual-circuit master cylinder associated with those wheel brakes of a vehicle axle that make a higher contribution to the vehicle deceleration and at the same time, cylinder/piston devices are installed between these wheel brakes and their associated service brake valves for the purpose of preventing hydraulic fluid from getting into these wheel brakes from the external energy source. The advantage is that neither gas nor air is carried into the wheel brakes where it could lead to the formation of bubbles in the event of a pressure drop and would be disadvantageous for an auxiliary brake operation by the master cylinder. The cylinder/piston devices increase the operational safety of the vehicle brake system when braking by muscle power.

9 Claims, 1 Drawing Sheet

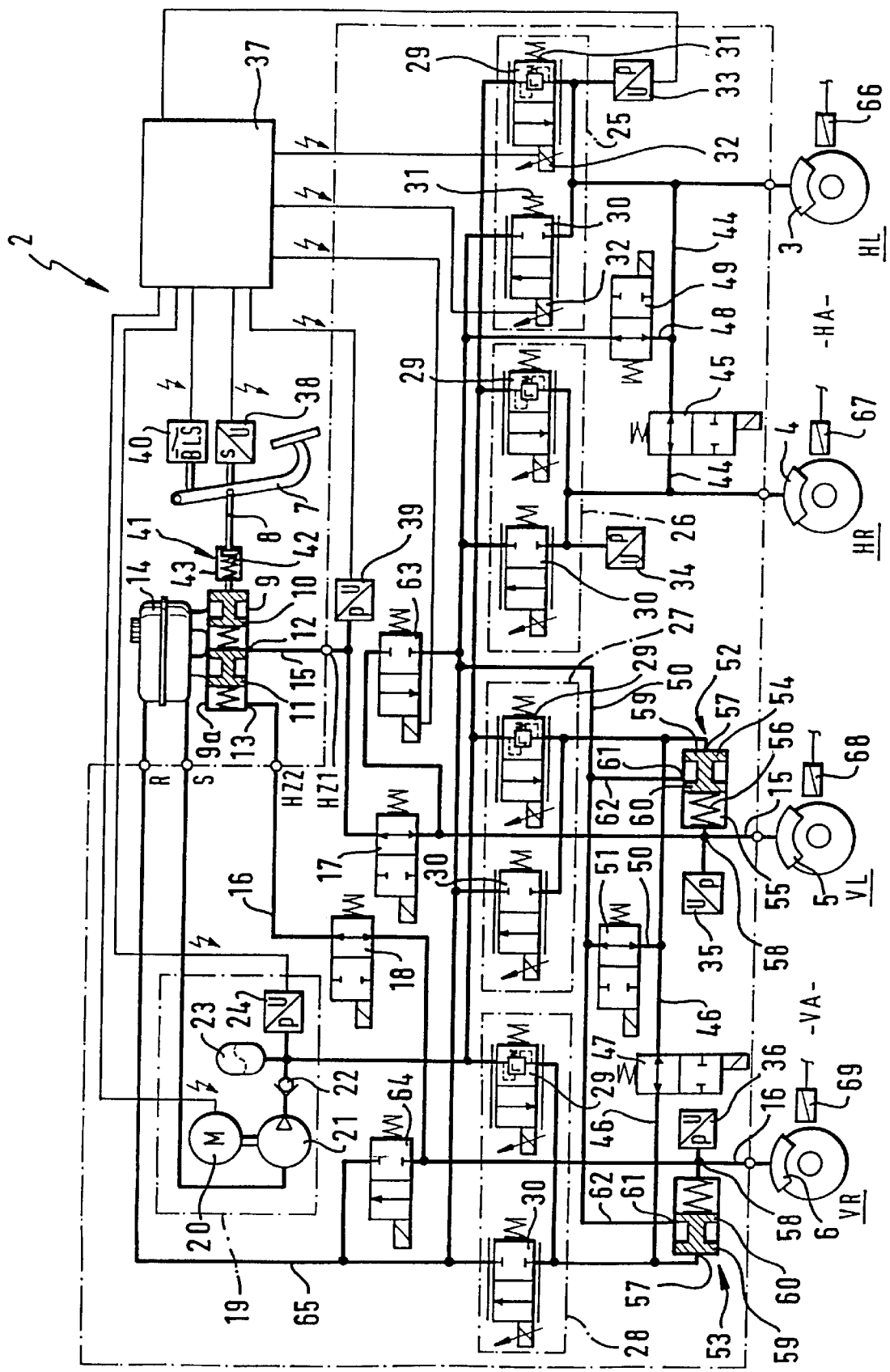

HYDRAULIC VEHICLE BRAKING SYSTEM

PRIOR ART

The invention is based on a hydraulic vehicle brake system for a vehicle.

FIGS. 1 and 2 of SAE Paper 96 0991 have disclosed two hydraulic vehicle brake systems with four wheel brakes for braking four wheels distributed on two vehicle axles by means of external hydraulic energy during normal brake operation, the service brake operation, and if need be, for example when there is a lack of or want of external hydraulic energy or electrical energy for controlling valves, for braking at least two wheels by means of muscle-powered energy in the so-called auxiliary brake operation. For the service brake operation, both vehicle brake systems have an external hydraulic energy source with a reservoir, pump, and pressure storage chamber, and between this external energy source and each of the four wheel brakes, have an electrically controllable brake valve device, which can be controlled at least indirectly as a function of a braking power signal from a braking power transmitter that can be adjusted by means of a brake pedal. For the auxiliary brake operation, the first vehicle brake system has a master cylinder that is embodied with a single circuit and can be actuated by means of the brake pedal, and connected to this, has an operation mode reversing valve, which is normally open and through which, by actuation of the brake pedal, the wheel brakes of the front vehicle axle can be actuated by means of hydraulic fluid from the master cylinder. For the auxiliary brake operation, the second vehicle brake system has a master cylinder that is embodied with two circuits and can be actuated by means of the brake pedal, and connected to this, has a first and a second operation mode reversing valve, wherein the front wheel brakes can be supplied by means of the first operation mode reversing valve and the rear wheel brakes can be supplied by means of the second one. The service brake valve devices of the second hydraulic vehicle brake system are each comprised of a first and a second normally closed 2-connection valve of the "throttling proportional directional control valve" type. The first throttling proportional directional control valve respectively constitutes a valve for increasing brake pressure and the second throttling proportional directional control valve constitutes a valve for decreasing brake pressure in the respectively associated wheel brake. Each wheel brake is associated with a pressure sensor for reporting the respective brake pressure present in the wheel brake to a regulator which is supplied with the braking power signal of the brake pedal-adjustable braking power transmitter in an altered or unaltered state and which, as a result of determined regulation variances, controls the throttling proportional directional control valves of the service brake valve devices associated with the wheel brakes with the intent of reducing regulation variances. For example, at least one of the throttling proportional directional control valves used for increasing the brake pressure is modified for a pressure regulating function to protect the external hydraulic energy source from pressure overload. For example, according to the prior application DE 196 36 432.9, the throttling proportional directional control valves mentioned can be exchanged for electrically or electromagnetically controllable proportional pressure valves of the "differential pressure regulating valve" type. By keeping the wheel brake pressure sensors used for the previously known hydraulic vehicle brake system, brake pressures can likewise be adjusted so that manufacture conditional tolerances of the proportional pressure valves can be compensated for.

A hydraulic vehicle brake system that has been disclosed by DE 40 37 662 A1, with four wheel brakes distributed on two vehicle axles, has a dual-circuit master cylinder that can be actuated by means of a brake pedal and disposed after it, two operation mode reversing valves in the form of 2/2-way valves, which are normally open, to supply the front and rear wheel brakes in the auxiliary brake operation by means of muscle-powered energy that is supplied to the brake pedal. For service brake operations, this hydraulic vehicle brake system has an external hydraulic energy source and for both of the rear wheel brakes jointly, has a cylinder/piston device and between this and the external energy source, has a common service brake valve device, which in this instance is simply comprised of two 2/2-way valves. A combination of a cylinder/piston device and a service brake valve device disposed between this cylinder/piston device and the external hydraulic energy source are also provided for the two front wheel brakes jointly, wherein this cylinder/piston device is embodied in a complex fashion for the purpose of distributing brake force between the front wheels and the rear wheels. The cylinder/piston devices prevent a mixing of the hydraulic fluid of the external hydraulic energy source with the hydraulic fluid that is common to the master cylinder and the wheel brakes, with the advantage that air and/or energy storage gas aspirated by a pump of the external hydraulic energy source, which air or gas is contained inside an external energy accumulator embodied as a membrane accumulator or a piston-type accumulator and could get into the hydraulic fluid, does not get into a wheel brake. Because the air or gas could form compressible bubbles there and as a result, could jeopardize an auxiliary brake operation with the intrinsically very limited pump capacity of the master cylinder. By respectively disposing an additional, normally open 2/2-way valve between each cylinder/piston device and the respectively associated wheel brakes, by temporarily closing the one or the other 2/2-way valve and by moving the associated piston of the cylinder/piston device in time-multiplex operation, it is possible to change brake pressures differently in the left and right wheel brakes for regulating wheel slip at least in the event of excessive brake pedal actuation. The time-multiplex operation prevents brake pressures in the left and right wheel brake of a vehicle axle from having the ability to be changed in opposition, i.e. the one brake pressure cannot increase while the other is being decreased.

DE 34 23 944 A1 has disclosed a power brake circuit for a left and a right wheel brake of an axle. Each wheel brake is associated with a separate multiposition valve for regulating brake pressure by monitoring by means of a pressure sensor or for preventing disadvantageously great wheel slip when braking. Both multiposition valves are connected to a normally closed two-position valve, which is in turn connected to a pressure reservoir. The valves are embodied so that their electromagnets are only to be acted upon with electrical excitation current in the event of the generation or alteration of brake pressures. As a result of an unavoidable leakage of valve element pairings that are disposed between the reservoir and the wheel brakes, since it cannot be prevented that undesirable wheel brake pressure could be produced despite existing wheel brake pressure sensors, the power brake circuit is associated with a pressure relief valve, which is embodied in the form of an electrically controllable 2/2-way valve that is normally open. Hydraulic fluid seeping through the above-mentioned two-position valve thus finds a path away from the wheel brakes. In the event of braking operations, the pressure relief valve is closed so that a wheel brake pressure can if necessary be increased to the pressure that prevails in the pressure reservoir.

ADVANTAGES OF THE INVENTION

The hydraulic vehicle brake system, combines the keeping of air or gas, which is disposed in the hydraulic fluid of the external hydraulic energy source, out of the wheel brakes of the vehicle axle most strongly involved in the vehicle deceleration to the advantage of auxiliary brake operations with the simultaneous advantage that for example brake pressure changes in opposition can be carried out simultaneously in the left and right wheel brake of this vehicle axle, which is advantageous, particularly during a deceleration of the vehicle, when there is a simultaneous further use of the wheel brakes for automatically stabilizing the vehicle in relation to its vertical axis, for example when negotiating a curve. Left and right brake pressures, which are automatically adjusted differently, produce a yawing moment for the purpose of stabilizing the vehicle in relation to the vertical axis and also aid the driver in steering into and out of a curve. This kind of stabilization is called driving dynamics regulation, for example, and is extensively described in "Kraftfahrtechnisches Taschenbuch" [Handbook of Automotive Engineering] Bosch, 22nd edition, Düsseldorf, VDI-Verlag, 1995, ISBN 3-18-419122-2.

Advantageous improvements and updates of the hydraulic vehicle brake system disclosed are possible by means of the measures taken herein. The features of the system produce an exemplary embodiment that comprises the most frequent industrial application, namely a vehicle brake system for a passenger vehicle. In contrast, the exemplary embodiment can be the vehicle brake system of a truck, preferably one with double-tired rear wheels.

The system has an advantage that by means of actuating the brake pedal in the auxiliary braking mode, leakage of a sealing ring designated for the execution of auxiliary braking operation can be detected by means of an unusual sinking of the brake pedal.

The features set forth produce the advantage that a volume expansion, which occurs as a result of a possibly considerable heating of hydraulic fluid in the wheel brakes of the vehicle axle most strongly contributing to the vehicle deceleration, can be compensated for, while the operation mode reversing valve is closed in the event of a continuing actuation of the brake pedal and a brake slip regulating operation possibly occurring at the same time. If the pistons of the cylinder/piston devices temporarily assume their initial position, possibly by means of the above-mentioned volume expansion in the event of a brake pressure reduction, particularly for the purpose of wheel slip reduction when driving on ice, it is possible to adjust lower brake pressures.

Other characterizing features set forth produce the advantage, which was disclosed for the second hydraulic brake system previously made known by the SAE Paper 96 0991, of brake pressures of the same magnitude in a left and a right wheel brake of the same vehicle axle in normal service brake operation in order to prevent unpleasant yawing moment and on the other hand, in a reasonably priced manner, also produce the advantage of preventing undesirable brake pressure in the event of valve leakage in connection with a disadvantageous quantity of drift in at least one brake pressure sensor or in the braking power transmitter. With regard to brake pressure reductions, the relief valves are redundant to the service brake valve devices.

BRIEF DESCRIPTION OF THE DRAWING

A wiring diagram of the hydraulic vehicle brake system according to the invention is represented in the sole FIGURE and will be described in detail below.

DESCRIPTION OF THE EXEMPLARY EMBODIMENT

The hydraulic vehicle brake system 2 according to the invention and according to the FIGURE has hydraulically actuatable wheel brakes 3, 4, 5, and 6, a brake pedal 7 for executing auxiliary braking operations with muscle power, and a master cylinder 9, which is embodied with two circuits, the master cylinder can be actuated by way of a pedal rod 8 with the exertion of force on the brake pedal 7, and for this purpose, has a first master cylinder piston 10, a second master cylinder piston 11, a first master cylinder connection 12 associated with the first master cylinder piston 10, and a second master cylinder connection 13 associated with the second master cylinder piston 11, as well as a reservoir 14 for supplying fluid to the master cylinder. The master cylinder pistons 10 and 11 and the reservoir 14 including a housing 9a can be manufactured with structural features that can be inferred from the prior art. A first auxiliary brake line 15 leads from the first master cylinder connection 12 to the wheel brake 5. The wheel brake 5 is preferably a front wheel brake. In the same manner, a second auxiliary brake line 16 leads from the second master cylinder connection 13 to the second front wheel brake 6. An operation mode reversing valve 17 or 18 is respectively installed in each of the two auxiliary brake lines 15 and 16, and in this instance, these valves are embodied as technically simple 2/2-way valves of the normally open type and in this instance, are electrically controllable. Therefore in a manner that is known per se, an actuation of the brake pedal 7 results in a transmission of muscle-powered energy via the pedal rod 8, a displacement of the first master cylinder piston 10, and a pressure increase at the first master cylinder connection 12, and finally a displacement of the second master cylinder piston 11 with a pressure increase at the second master cylinder connection 13. The pressure increases in the master cylinder connections 12 and 13 are transmitted in a known manner by means of the auxiliary brake lines 15 and 16 and the open operation mode reversing valves 17 and 18 into the wheel brakes 5 and 6 for the purpose of braking the front wheels, not shown, of a vehicle that is equipped with them. This will suffice for the description of the hydraulic vehicle brake system for the muscle-powered brake operation, which will be the necessary auxiliary operation in the event of an emergency. Since one skilled in the art of motor vehicle brake systems is in a position to design hydraulic vehicle brake systems used for auxiliary brake operation, it is not necessary to address here the manner in which the diameter of the master cylinder pistons 10 and 11 and their strokes are to be selected as a function of a weight of the vehicle and its loading.

For the service brake operation by means of external hydraulic energy, the vehicle brake system 2 has an external hydraulic energy source 19, which has a pump 21 that can be driven by an electric motor 20, a check valve 22, an accumulator disposed after the check valve 22, for example an accumulator of the type with a membrane and gas buffer, a pressure sensor 24 for measuring pressure in the accumulator 23 and emitting the pressure in the form of an electrical signal, as well as the reservoir 14, which can therefore be called an integral reservoir. Furthermore, the service brake operation by external hydraulic energy is served by four service brake valve devices 25, 26, 27, and 28, which in this instance each include two valves 29, 30 and are associated with the wheel brakes 3, 4, 5, and 6. Two of these service brake valve devices are disposed between the wheel brakes 3 and 4 and the accumulator 23 as well as the reservoir 14 of the external hydraulic energy source 19. The first valves 29 and the second valves 30 are depicted here as normally closed proportional directional control valves, with closing springs 31 and with variably excitable electromagnets 32, so that between the closed positions, which are characterized in the symbols by means of the right squares, and the widest possible open positions, which are represented by means of the respective left squares and the through arrows, intermediary positions can be adjusted, which have arbitrary throttling actions. Furthermore, wheel brake pressure sensors 33, 34, 35, and 36, which respectively communicate with the wheel brakes 3, 4, 5, and 6, are provided for the above mentioned service brake operation, particularly due to the embodiment of the service brake valves 25 to 28 as throttling directional control valves 29, 30, and these wheel brake pressure sensors supply electrical signals to a combined controlling and regulating device 37. So that the control device 37 can control or regulate, a first braking power transmitter 38 is coupled here to the brake pedal 7 and connected to the controlling and regulating device 37. Preferably for the sake of redundancy, a second braking power transmitter 39 is provided, which is embodied here as a pressure sensor and is connected to the auxiliary brake line 15. This second braking power sensor 39 is also connected to the controlling and regulating device 37. For example, in a reasonably-priced manner, the first braking power transmitter 38 is embodied as an electric potentiometer. An ohmic potentiometer equipped by means of two resistance strips and a potentiometer arm, for example from the prior art, can be used for this. Therefore, a braking power presetting from the first braking power transmitter 38 can only be made if the brake pedal 7 can be moved. Since the operation mode reversing valves 17 and 18 must be closed for the service brake operation, a so-called brake light switch 40 is coupled, for example, to the brake pedal 7 and indicates a first movement of the brake pedal 7 to the controlling and regulating device 37, which as a result, actuates the operation mode reversing valves 17 and 18 into the closed position. Since hydraulic fluid is locked in the master cylinder 9 due to the closing of these operation mode reversing valves 17 and 18, which means the master cylinder pistons 10 and 11 cannot be moved further, a trailing spring device 41 is installed between the brake pedal 7 and the first master cylinder piston, for example in the vicinity of the pedal rod 8. This trailing spring device 41 includes, for example, a compression spring 42, which can be secured in captive fashion inside a housing 43 and at the same time, has a relatively low initial tension. It is therefore left to one skilled in the art to install a spring that is wound out of wire and has a linear or progressive characteristic curve. The scope of the present invention, though, does not extend to the embodiment of the trailing spring device 41. This trailing spring device 41 can namely be exchanged, for example, for a trailing spring device of the known type with a cylinder, piston, and spring, which can, like the pressure sensor 39, be connected to the master cylinder 9 in accordance with the SAE Paper 96 0991.

By means of the enumerated individual elements, service brake operation by means of external hydraulic energy is possible for at least the wheel brakes 3 and 4, which can be rear wheel brakes, as mentioned above. To this end, the controlling and regulating device 37 monitors the efficiency of the external hydraulic energy source 19 by way of the pressure sensor 24 and in particular, monitors the charge state of its accumulator 23 and the switching state of the brake light switch 40. In the event of an actuation of the brake pedal 7 by a driver and the resulting actuation of the brake light switch 40, the controlling and regulating device 37 recognizes that a service brake operation is to be executed, for which the operation mode reversing valves 17 and 18 are actuated into the closed position.

For the time being, the intent is to describe only the service brake operation for the above-mentioned rear wheel brakes 3 and 4. As already indicated, an actuation of the brake pedal 7 results in an adjustment of both the first braking power transmitter 38 and the second braking power transmitter 39. In a manner that belongs to the prior art, for a first path of the brake pedal, a signal from the first braking power transmitter 38 belonging to the controlling and regulating device 37 is preferable. In a manner that belongs intrinsically to the prior art, therefore, this first braking power transmitter 38 constitutes a device that reports a reference input to a regulator, not shown in the controlling and regulating device 37. Actual magnitudes of the brake pressures of the wheel brakes 3 and 4 are reported to the regulator by the wheel brake pressure sensors 33 and 34. Regulating deviations resulting from a deviation between the value of the reference input, which can be arbitrarily varied by the driver but at the moment, represents a set point value, and the respective magnitude of the indications from the brake pressure sensors 33 and 34 are detected by the regulator and converted into control signals for the service brake valve devices 25 and 26. As a result of the embodiment of the valves 29 contained in it, depending on the intensity of the excitation of the electromagnets 32, larger or smaller cross sections are unblocked there for external energy hydraulic fluid from the accumulator 23 to the wheel brakes 3 and 4. This results in the fact that brake pressure increases occur in these wheel brakes 3 and 4, which are detected as momentary brake pressures by the brake pressure sensors 33 and 34 and reported to the regulator in the controlling and regulating device 37. Depending on whether the driver moves the brake pedal 7 further or keeps it in a partially depressed position, a more or less rapid approximation of the brake pressures reported by the brake pressure sensors 33 and 34 to the current set point value will occur. If a sufficient approximation has occurred, then the controlling and regulating device 37 stops the excitation of the magnets 32 of the first valves 29 and therefore these valves 29 stop brake pressure increases. If the driver now reduces his force on the brake pedal 7, then it moves in the direction of its initial position. Therefore, the reference input emitted by the first braking power transmitter 38 becomes smaller, with the result that momentarily, there is a smaller set point value in relation to the momentarily existing actual value from the wheel brake pressure sensors 33 and 34. Consequently, the regulator determines a regulating deviation with a currently different sign and correspondingly carries out a control of the second valves 30 in the service brake valve devices 25 and 26. The electromagnets 32 of these second valves 30 then supply outflow cross sections, for example as a function of the regulating deviation, so that hydraulic fluid can return from the wheel brakes 3 and 4 to the reservoir 14 of the external hydraulic energy source 19, which means that hydraulic fluid flowing out of the wheel brakes 3 and 4 results in a reduction of the wheel brake pressures. Because of the previously mentioned progression of the trailing spring device 41, relatively long brake pedal paths are required for relatively low wheel brake pressures so that an arbitrary presetting of braking power by the driver is favorably resolved and leads to a sensitive brake pressure regulation.

With a more forceful actuation of the brake pedal 7, due to the above-mentioned progression of the trailing spring device 51, the second braking power transmitter 39 has a steeper signal increase than the first braking power transmitter 38. This is utilized by the controlling and regulating device 37 and therefore, the above-mentioned more forceful actuation of the brake pedal [and] reference inputs from the second braking power transmitter 39 form the basis of wheel brake pressure regulation procedures, with the advantage of brake pressure that can be increased swiftly.

One thing not previously mentioned is that there is a first brake pressure compensation line 44 between the service brake valve devices 25 and 26 or their wheel brake cylinders 3 and 4 and a brake pressure compensation valve 45 that is built into this brake pressure compensation line 44 and is embodied, for example, as a 2/2-way valve and can be closed electrically, and there is a second brake pressure compensation line 46 between the service brake valve devices of the wheel brakes 5 and 6 of the front wheels as well as second a brake pressure compensation valve 47 that is built into this second brake pressure compensation line 46 and is in turn embodied, for example, as an electrically controllable, normally open 2/2-way valve.

For the sake of clarity, the disposition of the first brake pressure compensation line 44 associated with the wheel brakes 3 and 4 of the rear wheels will be described first. In the normal position shown, the above-mentioned open position, there is a hydraulic connection from the wheel brake 3 to the wheel brake 4 and vice versa. If in the event of an actuation of the brake pedal 7, brake pressure is intended to be produced in the wheel brakes 3 and 4, then the production of this brake pressure is observed by means of one of the wheel brake pressure sensors 33 or 34. The reason for this is that with unequal indications from the two wheel brake pressure sensors 33, 34 are to be expected because manufacturing tolerances and possibly disruptive unequal heating of the two wheel brake pressure sensors 33, 34 can hardly be prevented. For example, the wheel brake pressure sensor 33 supplies the wheel brake pressure actual value to the regulator in the controlling and regulating device 37 so that the controlling and regulating device 37 can, for example, control the service brake valve device 25 and at the same time, can also control the service brake valve device 26 for the purpose of a compensation of wheel brake pressure in relation to a braking power that can be adjusted by means of the brake pedal. The use of both service brake valves 25 and 26 is preferable if a wheel brake pressure is intended to increase swiftly by means of presetting by way of the brake pedal 7. If a difference should arise between the through flow quantities of hydraulic fluid through the two service brake valve devices 25 and 26, then the first brake pressure compensation line with its open first brake pressure compensation valve will sufficiently provide for brake pressure equality in the two wheel brakes 3 and 4. If on the other hand, the brake pedal 7 is actuated slowly, then a cross section that can be supplied by one of the two service brake valve devices 25, 26 would be enough for a sufficiently rapid brake pressure increase in the two wheel brakes 3 and 4, wherein the first brake pressure compensation line 44 and the open first brake pressure compensation valve provide for sufficient pressure equality in the wheel brakes 3 and 4. However, it can also be desirable that different brake pressures be adjusted in the wheel brakes 3 and 4, either by using the wheel brake pressure sensors 33 and 34 or without using these wheel pressure sensors in the event that there is a different magnitude of locking danger on the left and right of the vehicle. In an instance such as this, the first brake pressure compensation valve 45 is closed by the controlling and regulating device 37.

Up to this point, the description of the example has not mentioned the modification with a first relief line 48 and a first relief valve 49, wherein this first relief line 48 is connected to the first brake pressure compensation line 44 and is somehow connected to the reservoir 14, wherein the first relief valve 49 is incorporated somewhere into the first relief line 48, is normally open, and can be closed electrically. This first relief valve 49 is in turn depicted as a 2/2-way valve. The first relief valve 49 is switched into the closed position by the controlling and regulating device 37 as soon as the brake light switch 40 supplies a signal to the controlling and regulating device 37 because of the actuation of the brake pedal 7. After the closing of the first relief valve 49, brake pressure is adjusted in the wheel brakes 3 and 4 in the manner described above. When the brake pedal 7 is released by the driver, the brake light switch 40 is opened and therefore, the controlling and regulating device 37 opens the first relief valve 49, with the result that if need be, for example due to indication errors of at least one of the two wheel brake pressure sensors 33 or 34 or due to the sticking of at least one of the two valves 30 in their closed positions, brake pressure remaining in the wheel brakes 3 or 4 disappears by means of the drainage of hydraulic fluid through the first relief valve 49 and the first relief line 48 to the reservoir 14.

Analogous to this, a second relief line 50, into which a second relief valve 51 is in turn incorporated, also leads from the second brake pressure compensation line 46.

Diverging from the direct connection of the wheel brake 3 to its service brake valve device 25 or of the wheel brake 4 to its service brake valve device 26, the wheel brakes 5 and 6 can be respectively supplied with wheel brake pressure from the service brake valves 27 or 28 indirectly by means of a first cylinder/piston device 52 or a second cylinder/piston device 53. Pistons 54 of the cylinder/piston devices 52, 53 can be moved in a sealed fashion inside cylinders 55 and are moved by means of springs 56 into normal positions, which are shown in the FIGURE. Correspondingly, the pistons 54 are disposed in the vicinity of connections 57, which communicate with the service brake valve devices 27 and 28, respectively. Other connections 58 in the vicinity of the springs 56 thus communicate with the wheel brakes 5 and 6, respectively. In the manner indicated, the pistons 54 have for example two sealing rings 59, 60 spaced axially apart at intervals that are greater than structurally determined strokes of the pistons 54. It is left up to the designer to use so-called toroidal sealing rings or junk rings, of the kind usually used in master cylinders, as sealing rings in the manner indicated. Between the sealing rings 59 and 60, a leakage draining opening 61 is associated with each of the cylinders 55, wherein a drain line 62 can lead away from these leakage draining openings 61 in the direction of the reservoir 14. The drain line 62 can be omitted in and of itself. The drain line 62 produces the advantage that dirt and condensation water or even saline spray water is prevented from penetrating into the cylinder/piston devices 52, 53.

In this instance, the functional description for the service brake operation with the wheel brakes 5, 6 by external energy only concerns the operation mode reversing valve 18 and the two service brake valve devices 27 and 28 and the two cylinder/piston devices 52 and 53 for the wheel brakes 5 and 6. By way of the brake light switch 40 and the controlling and regulating device 37, an actuation of the brake pedal 7 produces a closing of the operation mode reversing valves 17 and 18 so that pressure generated in the master cylinder 9 does not reach the wheel brakes 5 and 6. In a manner already described for the service brake valves 25 and 26 of the wheel brakes 3 and 4, for example both service brake valve devices 27 and 28 are also controlled as a function of the actuation of the brake pedal 7, by means of which in the event that the valves 29 used to increase brake pressure open, the pistons 54 are acted upon and as a result, are moved counter to the forces of the springs 56 and displace hydraulic fluid into the wheel brakes 5 and 6 with the result that brake pressure increases occur in the wheel brakes 5 and 6. To this extent, the only difference between the generation of brake pressure for the wheel brakes 3 and 4 and that for the wheel brakes 5 and 6 is that hydraulic fluid flows through the valves 29, but does not reach the wheel brakes 5 and 6. Instead, only hydraulic fluid, which is held in store in the cylinders 55 in the region of the springs 56, is supplied to the wheel brakes 5 and 6. Consequently, the pistons 54, along with the sealing rings 59 and 60, constitute barriers that prevent gas and/or air possibly contained in the hydraulic fluid, which has first flowed through the valves 29, from flowing further into the wheel brakes 5 and 6. If dissolved gas or air from the hydraulic fluid that has flowed through the valves 29 were to get into the wheel brakes 5 and 6, then this air or this gas could possibly form bubbles in the event of a brake pressure decrease, with the disadvantage that in the event of an auxiliary brake operation that could possibly become necessary, a sufficient braking action would not be produced with only muscle-powered energy and hydraulic fluid from the master cylinder 9. It is clear, therefore, that the cylinder/piston devices 52 and 53 are used for safety in the manner according to the invention.

The leakage drain openings 61 and the drain lines 62 have the task of relieving hydraulic fluid, which comes from the external hydraulic energy source 19 and has possibly entered along the sealing rings 59, and diverting it to the reservoir 14 so that gas or air possibly dissolved in the hydraulic fluid cannot pass the sealing rings 60, particularly when brake pressure prevails in the wheel brakes 5 and 6. When the service brake system is switched off, for example by means of the removal of an ignition key, and therefore when in the auxiliary brake mode, by actuating the brake pedal 7, a possible leakage of the master cylinder-side sealing ring 59 can be detected by means of an unusual sinking of the brake pedal.

The second brake pressure compensation line 46 associated with the service brake valves 27 and 28, with the associated second brake pressure compensation valve 47 as well as the second relief line 50 and the second relief valve 51 incorporated into this relief line fulfill the same tasks as the above-described first brake pressure compensation line 44 with the first brake pressure compensation valve 45 and the first relief line 48 with the first relief valve 49 and therefore do not need to be described further.

For example, in this instance, a normally closed volume draining valve 63 or 64 is connected to each of the wheel brakes 5 and 6 and is embodied in the form of a normally closed 2/2-way valve, can be switched as needed into the open position by the controlling and regulating device 37, and in so doing, opens into a line 65 leading to the reservoir 14. The controlling and regulating device 37 then triggers the opening of one or both volume draining valves 63, 64 if brake pressures in the wheel brakes 5 or 6 remain too high when the brake pedal 7 is actuated with the aid of the valves 30 of the service brake valve devices 27 and 28, which valves are intrinsically designated for brake pressure decreases. This kind of excessive brake pressures can be due to heating of the wheel brakes 5 and 6 and as a result, a volume expansion of the hydraulic fluid disposed in the heated wheel brakes 5 and 6. In principle, this hydraulic fluid seeks the way into the cylinder/piston devices 52 or 53 and is also contained there as long as the pistons 54 can still be moved in the direction of their normal positions. If the pistons 54 have reached their normal positions early should the need arise, the controlling and regulating device 37 recognizes this indirectly by virtue of the fact that wheel brake pressures measured by wheel brake pressure sensors 35 and 36 cannot be reduced to values which, by actuation of the brake pedal 7, are given to the controlling and regulating device 37 by way of at least one of the braking power transmitters 38, 39. The volume draining valves 63 and 64 therefore provide for the fact that with a disadvantageously intense expansion due to heating of the hydraulic fluid of the wheel brakes 5 and 6, a particular position of the brake pedal 7 also effectively produces a particular brake pressure. If the volume draining valves 63 and 64 are omitted, then a driver would have to be able to recognize an intrinsically excessive brake pressure in a possibly excessive vehicle deceleration and, as the human regulator, correspondingly move the brake pedal 7 toward its normal position. However, if as a result, an ending of the service brake operation occurs, the pressure present in the wheel brake cylinder 5 and 6 impinges in the master cylinder 9 if the operation mode reversing valves 17 and 18 open, and can therefore have an annoying effect on the driver's foot by way of the master cylinder piston 10, the trailing spring device 41, and the pedal rod 8 as well as the brake pedal 7. In principle, therefore, the operational safety of the vehicle brake system is not impaired since a driver can trigger a next service brake operation by pressing down the brake pedal 7 and can choose a vehicle deceleration once more.

As has already been described for the brake valve devices 25 and 26, the existing brake valve devices 27 and 28 can also be used for automatic braking or for automatic changing of brake pressures. One case of this is the limitation of drive slip, provided that it is to be carried out by means of the wheel brakes 5 and 6 in this instance. However, brake slip regulating operation can also be carried out with the service brake valve devices 25 and 26 as well as with the service brake valve devices 27 and 28, by evaluating wheel rotation signals, which [are generated] in wheel rotation sensors 66 to 69, which are associated in a manner that is known per se with wheels that are not shown and are to be braked by means of the wheel brakes 3 to 6. The controlling and regulating device 37 monitors signals from these wheel rotation sensors 66 to 69 with regard to their chronological spacing for the purpose of making the wheel locking tendency detectable and in case of a detection, a braking power indication from the braking power transmitter 38 or 39 is ignored in favor of at least one brake pressure decrease, which counteracts a wheel locking tendency in way that is known per se, and as a result, reduces wheel slip and aids in the controllability of the vehicle. Since the above-mentioned measure for preventing the danger of wheel locking is already known as well in connection with vehicle brake systems operated by external hydraulic energy, technical control measures or technical regulation measures are not addressed further here. It should be additionally noted, merely for the sake of completeness, that as a result of the automatic changeability of wheel brake pressures in accordance with automatic brake pressure generation for a drive slip regulating operation, an automatic brake pressure generation can also be used for the stabilization of the vehicle around its vertical axis described in the introduction to the specification, for the purpose of better controllability by means of automatic braking for the purpose of producing stabilizing yawing moments.

In addition, it should be noted that at least one of the above-described volume diversion valves 63, 64 can also be opened by the controlling and regulating device 37 equipped for this, even during brake slip regulating operation, if a respective wheel brake slip cannot be reduced to a low value desired depending on the situation by means of at least one of the brake valve devices 27 or 28 due to an above-mentioned volume expansion of the hydraulic fluid induced by a heating of the brakes. The volume diversion valves 63, 64 are used in this manner for the reliable reduction of brake pressure and therefore aid the controllability of a vehicle equipped in this fashion.

The foregoing relates to a preferred exemplary embodiment of the invention, it being understood that other variants and embodiments thereof are possible within the spirit and scope of the invention, the latter being defined by the appended claims.

What is claimed is:

1. A hydraulic brake system for a vehicle comprising wheel brakes for four wheels, in which the wheels are distributed on a first and a second vehicle axle, comprising an external hydraulic energy source, and has electrically controllable service brake valve devices disposed between said energy source and the wheels, a first braking power transmitter (38) that is actuated by a brake pedal, for carrying out service brake operations by operation of the service brake valve devices, a dual-circuit master cylinder, said master cylinder is actuated by the brake pedal and is intended for carrying out an auxiliary brake operation by muscle-powered energy via said brake pedal, wherein between the master cylinder and wheel brakes that are supplied from said master cylinder, a normally open operation mode reversing valve (17, 18) is disposed in each brake circuit, said reversing valve is switched into a closed position for the service brake operation, and wherein at least the service brake valve devices are controlled by a controlling and regulating device, a cylinder/piston device (52, 53) is interposed between the wheel brakes (5, 6) of the vehicle axle that is designed for a greater braking contribution to the vehicle braking and the associated, electrically controllable service brake valve devices (27, 28), and that the wheel brakes (5, 6) designed for the greater braking contribution to the vehicle braking are connected to the operation mode reversing valves (17, 18) associated with the two brake circuits of the master cylinder 9, a normally closed volume diversion valve (63, 64) is connected to the wheel brakes (5, 6) which are connected to the cylinder/piston device (52, 53), that said volume diversion valves (63, 64) are connected to a reservoir (14) of the external hydraulic energy source (19) and are opened by the controlling and regulating device (37) in the event that a brake pressure reduction that is controlled by service brake valves (27, 28) or a wheel brake slip reduction proves to be insufficient.

2. The hydraulic vehicle brake system according to claim 1, in which the wheel brakes of the front wheels are connected with the cylinder/piston devices (52, 53).

3. The hydraulic vehicle brake system according to claim 1, in which the wheel brakes of the rear wheels are connected with the cylinder/piston devices (52, 53).

4. The hydraulic vehicle brake system according to claim 1, in which the pistons (54) of the cylinder/piston devices (52, 53) are each equipped with two sealing rings (59, 60), that the axial distances between the sealing rings (59, 60) are greater than a stroke of the pistons (54), and that associated cylinders (55) have leakage drain openings (61) between the two respective sealing rings (59, 60).

5. The hydraulic brake system according to claim 1, in which a first brake pressure compensation line (44) is disposed between the service brake valve devices (25, 26) and the wheel brake cylinders (3, 4) of one vehicle axle, said first brake pressure compensation line has a normally open brake pressure compensation valve (45) built into it, said second brake pressure compensation line and a second brake pressure compensation line (46) is disposed between the service brake valves (27, 28) and the cylinder/piston devices (52, 53) that are connected with another vehicle axle, said second brake pressure compensation line has a normally open brake pressure compensation valve (47) built therein and that each connection of the first and second brake pressure compensation valve (45, 47) is connected to a normally open first or second relief valve (49, 51), wherein the relief valves (49, 51) are connected by means of at least one relief line (48, 50) to the reservoir (14) of the external hydraulic energy source (19) and is closed for the service brake operation.

6. A hydraulic brake system for a vehicle comprising wheel brakes for four wheels, in which the wheels are distributed on a first and a second vehicle axle, comprising an external hydraulic energy source and electrically controllable service brake valve devices disposed between said energy source and the wheels, a first braking power transmitter (38) that is actuated by a brake pedal, for carrying out service brake operations by operation of the service brake valve devices, a dual-circuit master cylinder, said master cylinder is actuated by the brake pedal and is intended for carrying out an auxiliary brake operation by muscle-powered energy via said brake pedal, wherein between the master cylinder and wheel brakes that are supplied from said master cylinder, a normally open operation mode reversing valve (17, 18) is disposed in each brake circuit, said reversing valve is switched into a closed position for the service brake operation, and wherein at least the service brake valve devices are controlled by a controlling and regulating device, a cylinder/piston device (52, 53) is interposed between the wheel brakes (5, 6) designed for the greater braking contribution to the vehicle braking and the associated electrically controllable service brake valve devices (27, 28), and the wheel brakes (5, 6) designed for the greater braking contribution to the vehicle braking are connected to the operation mode reversing valves (17, 18) associated with the two brake circuits of the master cylinder 9, a first brake pressure compensation line (44) is disposed between the service brake valve devices (25, 26) and the wheel brake cylinders (3, 4) of one vehicle axle, said first brake pressure compensation line has a normally open brake pressure compensation valve (45) built into the first brake pressure compensation line, and a second brake pressure compensation line (46) is disposed between the service brake valves (27, 28) and the cylinder/piston devices (52, 53) that are connected with another vehicle axle, said second brake pressure compensation line has a normally open brake pressure compensation valve (47) built therein and that each connection of the first and second brake pressure compensation valve (45, 47) is connected to a normally open first or second relief valve (49, 51), wherein the normally open first and second relief valves (49, 51) are connected by means of at least one relief line (48, 50) to the reservoir (14) of the external hydraulic energy source (19) and can be closed for the service brake operation.

7. The hydraulic vehicle brake system according to claim 6, in which the wheel brakes of the front wheels are connected with the cylinder/piston devices (52, 53).

8. The hydraulic vehicle brake system according to claim 6, in which the wheel brakes of the rear wheels are connected with the cylinder/piston devices (52, 53).

9. The hydraulic vehicle brake system according to claim 6, in which the pistons (54) of the cylinder/piston devices (52, 53) are each equipped with two sealing rings (59, 60), that the axial distances between the sealing rings (59, 60) are greater than a stroke of the pistons (54), and that associated cylinders (55) have leakage drain openings (61) between the two respective sealing rings (59, 60).

* * * * *